United States Patent
Winter et al.

(10) Patent No.: US 10,093,996 B2
(45) Date of Patent: Oct. 9, 2018

(54) METHOD AND APPARATUS FOR RECYCLING TOP GAS FOR SHAFT FURNACE

(71) Applicant: SYNTHESIS ENERGY SYSTEMS, INC., Houston, TX (US)

(72) Inventors: John D. Winter, Houston, TX (US); Haruyasu Michishita, Charlotte, NC (US)

(73) Assignee: SYNTHESIS ENERGY SYSTEMS, INC., Houston, TX (US)

(*) Notice: Subject to any disclaimer, the term of this patent is extended or adjusted under 35 U.S.C. 154(b) by 289 days.

(21) Appl. No.: 14/967,375

(22) Filed: Dec. 14, 2015

(65) Prior Publication Data
US 2016/0186276 A1  Jun. 30, 2016

Related U.S. Application Data

(60) Provisional application No. 62/091,612, filed on Dec. 14, 2014.

(51) Int. Cl.
| | |
|---|---|
| *C21B 13/00* | (2006.01) |
| *F27D 17/00* | (2006.01) |
| *C21B 13/02* | (2006.01) |
| *F27B 1/10* | (2006.01) |

(52) U.S. Cl.
CPC ........ *C21B 13/0033* (2013.01); *C21B 13/008* (2013.01); *C21B 13/02* (2013.01); *F27B 1/10* (2013.01); *F27D 17/001* (2013.01); *F27D 17/004* (2013.01); *Y02P 10/122* (2015.11); *Y02P 10/126* (2015.11); *Y02P 10/143* (2015.11)

(58) Field of Classification Search
CPC .................................. F27B 1/10; F27B 15/10
See application file for complete search history.

(56) References Cited

U.S. PATENT DOCUMENTS

| | | | |
|---|---|---|---|
| 4,260,412 A * | 4/1981 | Summers ............ | C21B 13/0073 48/202 |
| 2013/0344450 A1* | 12/2013 | Grover ..................... | F23L 7/00 432/29 |
| 2016/0186276 A1* | 6/2016 | Winter ................ | C21B 13/0033 75/444 |

* cited by examiner

*Primary Examiner* — Scott R Kastler
(74) *Attorney, Agent, or Firm* — O'Connor & Company

(57) ABSTRACT

Method, apparatus and system for improved energy efficiency in a direct reduction iron production process which uses a direct reduction shaft furnace and syngas as the reduction gas. The method and system of the invention use a part of the top gas emanating from the shaft furnace as transport gas for the gasifier, and control the volume of the top gas used as recycled top gas or fuel for the gas heater. The present invention achieves high energy efficiency, and reduces the need to use additional $CH_4$ source for the reduction gas.

12 Claims, 3 Drawing Sheets

METHOD AND APPARATUS FOR RECYCLING TOP GAS FOR SHAFT FURNACE

FIELD OF THE INVENTION

The present invention relates to direct reduction of iron ore. More specifically, the invention relates to a method and apparatus for minimizing the amount of top gas emanating from a direct reduction iron shaft furnace to be recycled back to the shaft furnace; and for using a portion of the purged top gas in a coal gasification process to lower overall power consumption, carbon emission, capital expenses, and operational expenses of direct reduction iron production.

BACKGROUND OF THE INVENTION

Direct reduction iron (DRI) production has been developed to overcome difficulties (e.g. high capital expense, high pollution, and the need of coking coal) of conventional blast furnaces. Direct reduction typically uses shaft furnaces (such as the MIDREX® Process) or coal-fired rotary kilns. Rotary kiln production is limited because the kiln cannot be built larger than about 200,000 tons per year. Also, the use of lump ore and coal with high levels of ash and sulfur yields in low quality product.

The shaft furnace (SF) process uses a reducing gas or a reduction gas, which comprises a significant amount of carbon monoxide (CO) and hydrogen ($H_2$) and a lesser amount of methane ($CH_4$) and inert gases such as nitrogen. Iron ore is reduced in solid state at 800 to 1,050° C. (1,470 to 1,920° F.) by the reducing gas. The reducing gas flows up the furnace, heating the descending iron oxide to reduction temperatures. The hydrogen and carbon monoxide react with the oxygen in the iron oxide, yielding the reduced products. The reduction gas is conventionally made by reformation of natural gas, heated to a suitable temperature, and then fed into the shaft furnace where the direction reduction takes place. Natural gas serves both as the fuel and source of the reductant.

The spent reducing gas exits from the top of the shaft furnace, and is called the top gas (TG), which still contains a substantial amount of both CO and $H_2$, and thus is usually recycled. The volume of the top gas does not vary for a given production rate. As much SF TG as needed to achieve the desired temperature is used as fuel gas for the reduction gas heater, then the balance is recycled back into the SF. Conventionally, the recycled top gas is mixed with fresh reduction gas (carbon monoxide, hydrogen, and lesser amounts of methane) made by reforming of natural gas or produced via coal gasification, and used again in the shaft furnace. To be recycled, the top gas must first be cleaned of solids and have its carbon dioxide content reduced. In order to remove carbon dioxide ($CO_2$), the gas must also be cooled. The combined feed to the shaft furnace should have a $CO_2$ content of 2-3 percent or less, which ensures that the reducing gas (containing the recycled top gas and fresh reducing gas, e.g. syngas from the gasification plant) has a sufficiently high reductants ($H_2$+CO) to oxidants ($H_2O$+ $CO_2$) ratio for efficient iron oxide reduction. The $CO_2$ removal system will also remove the sulfur gases contained in the recycled top gas. The building and operation of suitable equipment components with sufficient capacity for top gas cleaning and $CO_2$ removal represent a very significant capital and operational expenses in the direct reduction process, and it is desired that this expense be decreased as much as possible.

Not all of the top gas can be recycled in order to avoid the accumulation of inert gases in the shaft furnace reduction gas loop. Conventionally, this portion of the top gas not returning to the shaft is referred to as Top Gas Fuel (TGF), which is used as fuel in the process, to heat up the reduction gas introduced into the shaft furnace.

Because abundant, inexpensive natural gas is often not available in many locations, processes have been developed to use synthesis gas, or syngas, from gasification of coal, especially low grade coal and other low value carbonaceous fuel, as an alternative to reformed natural gas. U.S. Pat. No. 4,325,731 discloses a process in which the reducing gas is produced by reforming syngas from gasification. U.S. Pat. No. 4,046,555 provides another solution by adding relatively pure hydrogen to syngas to form a reducing gas, which includes a shift reaction to convert CO into $CO_2$ and $H_2O$. In U.S. Pat. No. 4,246,024, the reducing gas is produced by reforming a syngas within the same reactor where the direct reduction iron reactions take place. These processes all have high energy and capital costs and low efficiency.

A leading syngas production technology is the Synthesis Energy Systems Inc. (SES) fluidized bed gasification process, wherein solid feed stock, e.g. pulverized coal, is fed into a fluidized bed gasifier where it reacts with steam and oxygen or air, and is gasified to produce syngas which contains principally hydrogen, carbon monoxide, carbon dioxide. The syngas product also contains a lesser amount of methane, at concentrations appropriate for use as reducing gas in an iron reduction shaft furnace.

The syngas exiting the gasifier is hot, dirty, and contains a significant amount of non-reducing gas components. It is then cleaned, and conditioned to remove most of the undesired components, including some carbon dioxide.

Currently the syngas is also cooled and depressurized to about 3 barg in a turboexpander, which generates electricity.

There is a need to improve the energy efficiency of the conventional direct reduction iron production technology. There is also a need to improve the efficiency of using syngas produced from the coal gasification system.

The present invention provides improved processes involving the integration of two plants, which enable them to use the energy from both plants more efficiently.

SUMMARY OF THE INVENTION

By using a portion of the top gas as transport gas in the coal gasification process, the present inventors have devised a method for producing iron using a direct reduction iron production process, with significantly improved energy efficiency and decreased adverse environmental impact.

In the context of the present invention, low pressure syngas is mixed with recycled top gas after removing $CO_2$ to produce the required reducing gas. The mixed gas is then heated to over 900~1000° C. and enters the shaft furnace, where it reacts with the iron oxide to produce DRI.

In one embodiment, the present invention provides a method for producing iron using a direct reduction iron production process, wherein iron ore fed into a shaft furnace is directly reduced with a reduction gas in a shaft furnace, and a top gas emanates from the shaft furnace using syngas as at least a portion of the reduction gas, and wherein the syngas is produced in a fluidized bed coal gasification system in which carbonaceous materials react in a fluidized bed reactor under partially oxidized conditions with air and steam to produce syngas which comprises CO, $H_2$, $CO_2$ and $CH_4$, and wherein a transport gas is used in the movement of the carbonaceous materials into the reactor; the method comprising:

using at least a portion of the top gas as at least part of the transport gas in the fluidized bed reactor.

In one embodiment, the present invention provides an apparatus for producing iron using a direct reduction iron production process, wherein iron ore fed into a shaft furnace is directly reduced with a reduction gas in a shaft furnace and a top gas emanates from the shaft furnace, the apparatus comprising:

a first syngas delivery unit configured between a reactor of a fluidized bed coal gasification system and the shaft furnace, for delivering syngas as at least a portion of the reduction gas, wherein the syngas is produced in the reactor in which carbonaceous materials react in a fluidized bed reactor under partially oxidized conditions with air and steam to produce syngas which comprises CO, $H_2$, $CO_2$ and $CH_4$, and wherein a transport gas is used in the movement of the carbonaceous materials into the reactor, or movement and recycling of ash particles;

a first top gas delivery unit configured to recycle at least a portion of the top gas as a reduction gas to the shaft furnace; and a second top gas delivery unit configured between the shaft furnace and the reactor for using at least a portion of the top gas as transport gas in the reactor.

In one embodiment, the present invention provides a system for producing iron using a direct reduction iron production process, comprising:

a shaft furnace in which iron ore is directly reduced with a reduction gas, wherein a top gas emanates from the top thereof;

a fluidized bed coal gasification system in which carbonaceous materials react in a fluidized bed reactor under partially oxidized conditions with air and steam to produce syngas which comprises CO, $H_2$, $CO_2$ and $CH_4$, and wherein a transport gas is used in the movement of the carbonaceous materials into the reactor, and in the movement and recycling of ash particles;

a first syngas delivery unit for using the syngas as at least a portion of the reduction gas;

a first top gas delivery unit configured to recycle at least a portion of the top gas as a reduction gas to the shaft furnace; and a second top gas delivery unit for using at least a portion of the top gas as transport gas in the fluidized bed reactor.

Other objects and advantages of the present inventions will be pointed out herebelow.

BRIEF DESCRIPTION OF THE DRAWINGS

Embodiments according to the present invention will be further described in conjunction with accompanying figures as follows.

DESCRIPTION OF THE INVENTION

Figure 1:
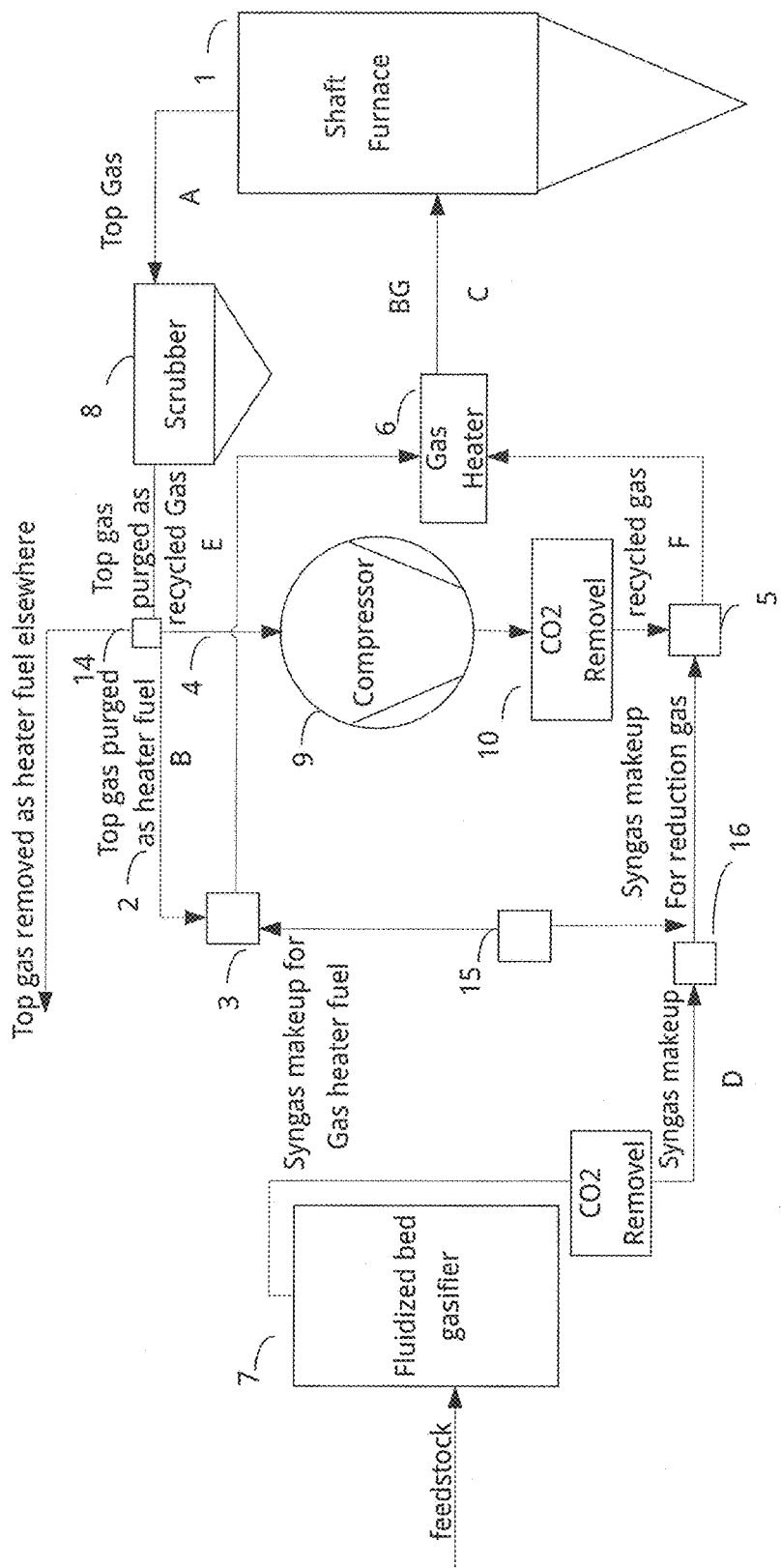
FIG. 1 shows an exemplary overall arrangement of the top gas recycle system of the present invention.

Referring to FIG. 1, an exemplary overall arrangement of a system for recycling top gas from a shaft furnace is shown, which may comprise sections as follows.

Iron ore in the form of iron oxide pellet, lump, or agglomerate is fed into a shaft furnace 1 and is directly reduced with a reduction gas injected into the shaft furnace 1. The direct reduced iron descends through the shaft furnace 1 by gravity and is discharged at the bottom. A top gas flow exits the shaft furnace from the top of the shaft furnace 1. The system may further comprise a scrubber 8 for scrubbing the top gas exiting from the shaft furnace. The top gas is communicated to the scrubber 8 that cools and cleans the top gas. At least a portion of the shaft furnace top gas is removed to avoid nitrogen or other inert element accumulation in the reduction gas.

The removed top gas may be used as recycled gas (see below), or as fuel gas (together with a fresh source of syngas as may be appropriate) for the gas heater to heat up the reduction gas up to a reduction temperature (such as 900~1000° C.) before its introduction into the shaft furnace. The system can comprise a second syngas delivery unit 15, configured between the reactor and a gas heater connected to the shaft furnace and used for delivering syngas as at least a portion of fuel gas to the gas heater to heat the reduction gas to a temperature sufficient for use in the direct reduction process.

Figure 2:
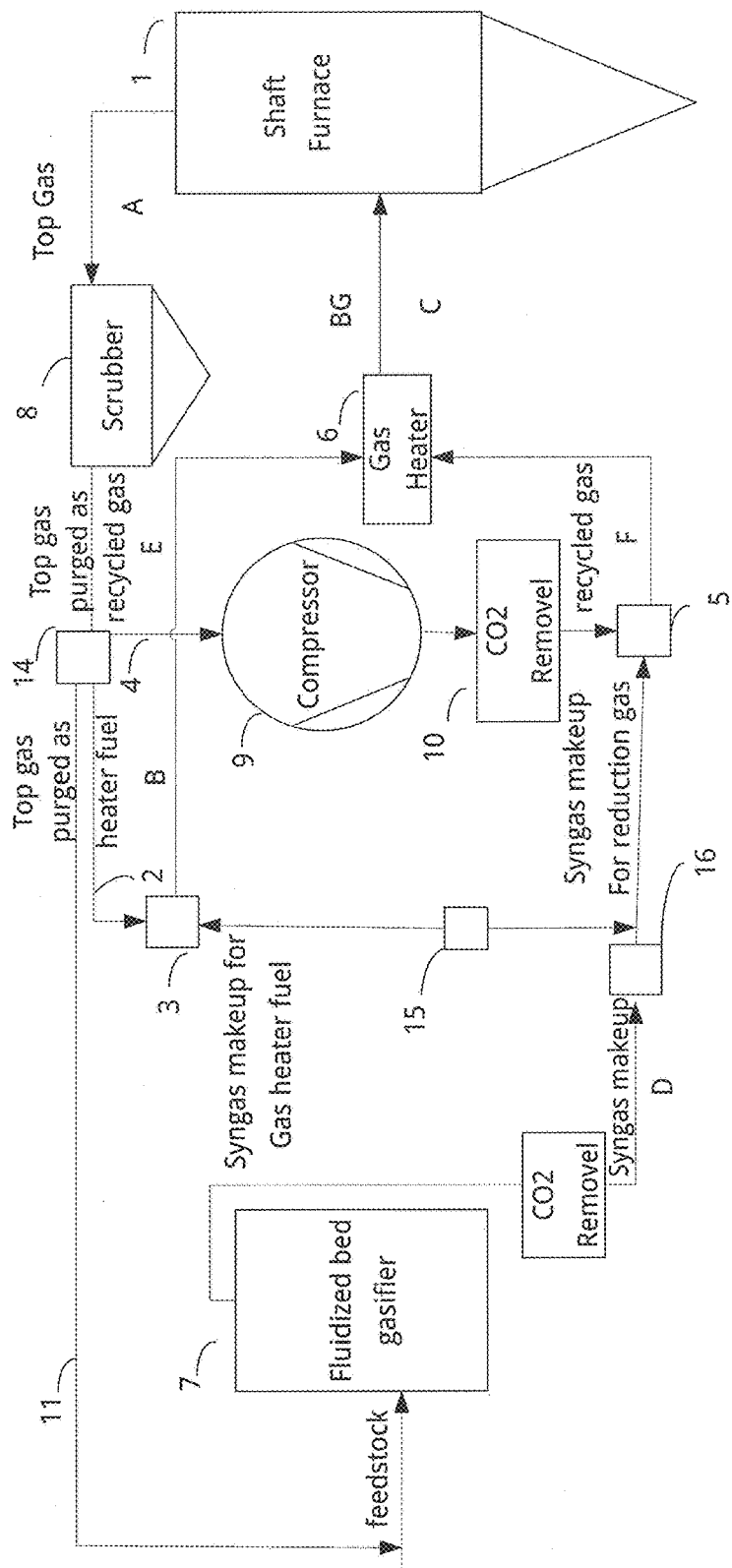
FIG. 2 shows an exemplary overall arrangement of the top gas recycle system according to an embodiment of the present invention, wherein a portion of top gas is sent back to the gasifier system as transport gas.

At least another portion of the removed shaft furnace top gas is recycled through the first top gas delivery unit 4 downstream the shaft furnace, mixed with a fresh source of syngas and delivered back into the shaft furnace 1. The top gas as recycled gas from the first top gas delivery unit 4 is compressed using a compressor 9, and is then sent to a carbon dioxide removal unit 10 to remove carbon dioxide from the recycled gas prior to being mixed with syngas as reduction gas. A first syngas delivery unit 16 is used for using the syngas as at least a portion of the reduction gas. The flow controller 14 controls the flow of the top gas removed as transport gas to minimize the amount of the top gas as recycled reduction gas. Similarly, as shown in FIG. 2, the flow controller 14 further controls the flow of the top gas removed as transport gas to minimize the amount of the top gas as recycled reduction gas.

Thus, fresh syngas is provided to the system for two uses, as gas heater fuel or as reduction gas. A first mixing unit 3 is used for mixing the top gas fuel with syngas for gas heater fuel to form a fuel gas; and a second mixing unit 5 is used for mixing the recycled gas with syngas for reduction gas to form a reduction gas. The gas heater 6 heats up the reduction gas to reduction temperature before feeding the heated reduction gas into the shaft furnace to reduce the iron ore.

The amount of top gas that needs to be purged is rather invariable. A minimum amount must be purged to avoid the inert element ($N_2$) accumulation is the reduction gas. Typically, $N_2$% in the reduction gas is maintained less 10% to avoid the inefficient increase of the reduction gas flow into shaft furnace. On the other hand, the amount of purged top gas cannot be more than the amount required as the fuel in the process, other it would be a very inefficient use of source syngas.

Minimizing the Amount of Purged Top Gas Recycled Back into the Shaft Furnace

The present inventors have discovered that, decreasing the volume of recycled gas used as reduction gas improves energy efficiency for direct reduction plant, because the recycled top gas needs to go through a compressor and $CO_2$ removal. Further, the pressure of shaft furnace reduction gas may be only 3 to 6 barg, so the efficiency of $CO_2$ removal system for recycled gas is low and needs high capital expense (CAPEX) and operating expense (OPEX). A reduced volume of top gas as recycled gas reduces the capacity need of the $CO_2$ removal and recycle compressor, and lowers steam consumption for $CO_2$ removal and power consumption at the compressor, thereby minimizing both OPEX and CAPEX for the shaft furnace.

Syngas has the calorific value of about 3600 kcal/NM3-HHV while SF TGF has 2600 kcal/Nm3-HHV. For some applications (e.g. in a steel mill), the caloric value of the top gas is sufficient as fuel gas, and there is no need to use a high pressure and high caloric value fuel gas such as syngas. A portion of the top gas can thus be purged as a gas fuel for these fuel sources, and the amount of purged gas would be increased, though the total required syngas volume will increase. It is, however, sometimes better to purge the top gas as a gas fuel for another user, depending on the price of various fuels, when the fuel user does not need the higher pressure and higher heating value for the fuel gas.

In some embodiment, a flow controller 14 is used to control the flow of the removed top gas to minimize the amount of the top gas as recycled reduction gas. The flow controller 14 decreases the volume of the top gas recycled as a recycled gas. Also, the flow controller 14 can increase the amount of the top gas removed as fuel for the gas heater of the shaft furnace, through a third top gas delivery unit 2 as shown in FIG. 1, or elsewhere, which results in decreasing the volume of the top gas removed as a recycled gas.

Using High Pressure Syngas as Motive Gas in an Ejector to Pressurize Reduction Gas Generally, the syngas pressure is much higher than that of the shaft furnace reduction gas, and a turbo-expander (including an upstream preheater) is needed to recover the energy and depressurize the syngas for reduction gas before mixing it with the recycled top gas and then sending the mixed reduction gas to the shaft furnace. These systems need higher CAPEX and maintenance cost.

On the other hand, the pressure of the top gas as recycled reduction gas is lower than the pressure within the shaft furnace and needs to be increased before sending it into the shaft furnace using a compressor.

Accordingly, in one embodiment, the present invention provides a method where the high pressure syngas is used as the motive gas of an ejector in place of a compressor, and the low pressure recycled top gas as a second fluid is entrained by the motive gas and the pressure of the mixed gas leaving the ejector is increased compared with that of the original recycled top gas.

Ordinarily, the volume of the recycled top gas is much more than that of the syngas, and it is not practical to simply use an ejector (using the high pressure syngas as the motive gas) to recycle top gas back to the shaft furnace. Rather, a compressor is required, which involves both high CAPEX and maintenance cost. The present invention uses a much reduced volume of the top gas as recycled reduction gas, thus the use of an ejector instead of a compressor to pressurize the top gas as recycled reduction gas becomes possible. With the ejector, the turbo-expander (including upstream preheater) as well as the compressor is eliminated. Thus, by using an efficient ejector instead of a compressor, where a syngas makeup is used as motive gas to pressurize the recycle gas, it further lowers the CAPEX and maintenance cost for direct reduction iron plant. Also, the substitution of the ejector for a compressor reduces the power consumption for direct iron plants.

Accordingly, in one embodiment, the present invention provides the use of an ejector to replace the conventional compressor in the recycled top gas loop. For example, the second mixing unit 5 can comprise an ejector, and the flow controller 14 is operable to adjust the amount of the top gas removed as fuel to influence the amount of the top gas as recycled reduction gas, such that the ratio of the top gas recycled as reduction gas to the syngas as a motive gas is low enough for the ejector to pressurize the recycled gas.

Use of Purged Top Gas as Transport Gas in Fluidized Bed Gasifier

A coal gasification system conventionally comprises a fluidized bed reactor 7 into which carbonaceous feedstock, such as coal, is fed to produce the syngas. The fluidized bed gasifier 7 may comprise vertical reaction vessel and a conical gas distribution grid positioned in the reaction vessel which defines the bottom surface of the fluidized bed. Oxygen and steam are provided through the gas distribution grid into the bed and react with the carbon containing solids to generate raw syngas. The raw syngas ascends and exits the gasifier 7 from the top, along with fine ash particles.

Normally, the coal feedstock is injected pneumatically by a pneumatic carrier gas, or transport gas, commonly $CO_2$, because the transport gas needs to be inert and oxygen free to prevent coal ignition before it reaches the fluidized bed reactor. In the gasifier, $CO_2$ is partially converted to CO by the water gas shift reaction. Excessive $CO_2$ can be removed from the syngas product using an acid gas removal (AGR) unit or system. Thus, using $CO_2$ as the coal transport gas imposes adverse effects on the coal gasifier and the downstream syngas handling system. See Higman and van der Burgt, Gasification, pp 197-198, Gulf Professional Publishing, 2011.

Alternatively, $N_2$ can also be used as transport gas, but it cannot be removed from the product syngas. Syngas also can be used as transport gas, but that has the disadvantages of imposing an added burden on system and reduces system's overall capacity. Higman and van der Burgt (2011), at page 197.

In an embodiment, the present invention discloses a method which uses a portion of the purged top gas as the transport gas for the syngas gasifier. It has been surprisingly determined that the use of the top gas as transport gas reduces coal and oxygen consumption, and lowers power consumption per unit of iron produced compared with using syngas, $N_2$ or $CO_2$ as the transport gas.

It has been surprisingly discovered that the variation in the amount of the top gas used as transport gas to transput solid particles does not significantly affect the actual input of reducing gas to the furnace. The solids particles can be carbonaceous feed stock and/or fine solids particles recovered from raw syngas in a solids-gas separation device, such as cyclones or filters connected to the gasifier. Recovered solids particles, like feed stock, are pneumatically transported to the gasifier by the purged top gas from shaft furnace as carrier gas.

Moreover, using a portion of the purged top gas as transport gas in the gasification system minimizes the recycling gas flowing through the $CO_2$ removal process, because the use of top gas for transport gas reduces the amount of recycled top gas that has to undergo cleaning or directly recycled to the shaft furnace.

A typical composition of purged top gas contains about CO 24%, $H_2$ 45%, $CH_4$ 3%, $H_2O$ 3%, $CO_2$ 20%, and $N_2$ 5%. Since the top gas contains a lot of $H_2$, CO and $CH_4$, the undesirable effects of $CO_2$ or $N_2$ as transport gas can be eliminated.

By replacing $CO_2$ or $N_2$ used as the coal transport gas with a portion of the purged top gas, the syngas production rate and capacity at gasifier can be significantly improved, and the consumption of coal, oxygen and steam at the gasifier can be reduced since CO, $H_2$ and $CH_4$ recycled from top gas, will contribute to the $H_2$ and CO content in syngas with least energy costs.

Accordingly, and referring to FIG. 2, a system according to this invention further comprises a second top gas delivery unit 11 for delivering at least a portion of the purged top gas as transport gas to assist the transport of solids particles into the fluidized bed reactor, from which the syngas makeup for reduction gas and syngas make up for gas heater fuel are provided. An exemplary embodiment of this aspect of the invention is shown in FIG. 2. As discussed above, a first syngas delivery unit 16 allows the use of the syngas as at least a portion of the reduction gas. A second syngas delivery unit 15 allows the use of the syngas as at least a portion of fuel gas to heat the reduction gas to a temperature sufficient for use in the direct reduction process.

Using Top Gas as Gasifier Transport Gas Improves Reduction Gas $CH_4$ Balance

Another benefit of sending a portion of the top gas to the gasification system is uncreased flexibility of $CH_4$ content in the reduction gas. Normally, a certain amount of $CH_4$, typically 3~8%, should be maintained in the reduction gas and introduced into a shaft furnace to reduce and carburize the iron. However, under certain temperature and pressure of gasification specified for the target productivity, $CH_4$% in syngas is not high enough to maintain the target $CH_4$% in the reduction gas. Also, $CH_4$ is consumed in the shaft furnace. Therefore, conventionally, when syngas is applied to a direct reduction iron shaft furnace, additional $CH_4$ from other sources such as expensive natural gas is required.

The inventors of the present invention further found that, increasing the amount of the top gas used as transport gas leads to an increase of $CH_4$% in syngas. As more top gas is recycled to the gasification system, more $CH_4$ is retained in the syngas loop, which helps maintain $CH_4$% in syngas to achieve a desired $CH_4$ level in the reduction gas and provides flexibility of $CH_4$ in the shaft furnace reduction gas. Table 5 below shows comparative examples at the gasifier.

Several embodiments of the present invention are illustrated in the non-limiting examples below.

EXAMPLES

Example 1. Use of the Top Gas as Transport Gas Reduces Power Consumption

Table 1 below shows a comparison of energy consumption between using the shaft furnace (SF) top gas (TG) and $CO_2$ as transport gas. By replacing $CO_2$ with a portion of the top gas, the consumption of $O_2$ at the gasifier was reduced from 1645 kgmol/h to 1604 kgmol/h. Because $O_2$ is normally produced by an Air Separation Unit (ASU), less consumption of $O_2$ resulted in less power consumption (from 26797 kW to 26129 kW) at the ASU, provided that the power consumption at the ASU per unit $O_2$ remains 16.29 kW/kgmol. Furthermore, the volume of syngas required to produce DRI was decreased from 800 $Nm^3$/ton to 700 $Nm^3$/ton while the DRI production was increased from 142 ton/h to 144 ton/h. Less syngas required to produce DRI further contributed to less coal per ton of direct reduced iron. These results show that less power per ton of direct reduced iron is used by using the top gas as transport gas.

TABLE 1

Comparison of Power Consumption

|  |  | Recycled SF TG as transport gas | $CO_2$ as transport gas |
|---|---|---|---|
| $O_2$ Consumption | (kgmol/h) | 1604 | 1645 |
| ASU power consumption/unit $O_2$ | (kW/kgmol) | 16.29 | 16.29 |
| ASU power consumption | (kW) | 26129 | 26797 |
| Syngas (CO + $H_2$ + $CH_4$) requirement for DRI | ($Nm^3$/ton) | 700 | 800 |
| DRI Production | (ton/h) | 144 | 142 |
| Power savings per unit DRI production | (kW/ton) | 19.430 | |

Table 2 shows a comparison for compressor power consumption between using the top gas recycled from shaft furnace and $CO_2$ as transport gas. Gas used as transport gas needs to be pressurized before conveying coal particles to the reactor. Since the pressure of the recycled top gas from shaft furnace (6 barg) is much higher than the $CO_2$ recycled from the gasification system (0.2 barg), power consumption at the compressor for compressing the top gas recycled as transport gas for transport gas purpose was 2520 kw, much less than the power consumption of pressuring recycled $CO_2$.

TABLE 2

Comparison for Compressor Power Consumption

|  |  | Top Gas recycle | $CO_2$ recycle |
|---|---|---|---|
| Transport gas | kgmol/h | 1213 | 985.6 |
| Compressor inlet pressure | Barg | 6 | 0.2 |
| Compressor outlet pressure | Barg | 42 | 42 |
| Compressor Power Consumption | Kw | 2520 | 4150 |
| Compressor Power Consumption Ratio | — | 0.61 | 1 |

Example 2. TG Volume to be Recycled was Reduced if Top Gas was Used as Fuel

Table 3 shows a comparative example illustrating that when a portion of the top gas was used as transport gas for the gasifier, the volume of top gas recycled as reduction gas was further decreased. Results here showed that the needed capacity of the DRI $CO_2$ removal system was reduced by 20%, further reducing energy consumption of the system.

As shown in FIG. 1, top gas can be used as gas heater fuel without sending it back to the gasifier. By contrast, as in FIG. 2, the top gas is used as gas heater fuel as well as transport gas for the gasifier. The gas volumes at positions A, B, C, D, E and F in FIGS. 1 and 2 are shown in Table 3.

TABLE 3

Comparison of Gas Volumes in FIG. 1 and FIG. 2

|  | Position | | | | | |
|---|---|---|---|---|---|---|
|  | A SF TG | B SF TG purged | C BG | D Syngas Makeup | E Recycled gas | F Recycled gas |
| FIG. 1 ($Nm^3$/h) | 196,927 | 31,885 | 184,876 | 88,329 | 123,360 | 101,117 |

TABLE 3-continued

Comparison of Gas Volumes in FIG. 1 and FIG. 2

| | Position | | | | | |
|---|---|---|---|---|---|---|
| | A SF TG | B SF TG purged | C BG | D Syngas Makeup | E Recycled gas | F Recycled gas |
| FIG. 2 (Nm$^3$/h) | 199,530 | 61,199* | 186,738 | 108,500 | 96,375 | 77,572 |
| % | — | 91% more | — | — | 20% less | 23% less |

*This amount includes the fuel for the gas heater as well the gas sent to the gasifier as transport gas.

In FIG. 2, the volume of the top gas recycled to the gasifier as transport gas through the third delivery unit 11 is 27,650 Nm$^3$/h. As shown in Table 3, by removing this additional portion of the top gas as transport gas and recycling it back to the gasifier, the amount of the top gas purged was increased by about 100% (from 31,885 Nm$^3$/h to 61,199 Nm$^3$/h), and the top gas recycled as reduction gas flowing through $CO_2$ removal and the compressor was decreased by around 20% (from 123,360 Nm$^3$/h to 96,375 Nm$^3$/h). Further the volume of the recycled gas at position F decreased by 23% (from 101,117 Nm$^3$/h to 77,572 Nm$^3$/h). This lowers CAPEX and OPEX for direct reduction iron plants. Although the syngas makeup was increased from 88 k to 108 k Nm$^3$, this increase in syngas came from the recycled top gas, not from fresh coal and oxygen. For the same amount of coal, net useful gas yield was increased.

Table 4 shows the comparative results, illustrating that when the top gas recycled as reduction gas was decreased by using top gas as transport gas for the gasifier, the ratio of pressurized top gas to the motive gas is lowered. Option 1, as shown in FIG. 1, was the process that the top gas was only used as gas heater fuel without being sent back to the gasifier. Option 2, as shown in FIG. 2, was another process according to this invention where the top gas was used as gas heater fuel and also sent back to the gasifier as transport gas. The ratio of pressurized top gas to the motive gas was decreased to 0.71 where it is more suitable to use in an ejector, replacing a compressor, to pressurize the recycled top gas.

TABLE 4

Comparative Example of Gas Volume for Pressurization

| | Option 1 | Option 2 |
|---|---|---|
| Pressurized TG (Recycled gas from SF TG Used as Reduction Gas) (Nm$^3$/h) | 101,000 | 77,500 |

TABLE 4-continued

Comparative Example of Gas Volume for Pressurization

| | Option 1 | Option 2 |
|---|---|---|
| Motive Gas (Syngas used for reduction gas) (Nm$^3$/h) | 87,000 | 108,500 |
| Ratio of Pressurized Top Gas to Motive gas | 1.16 | 0.71 |

Figure 3:
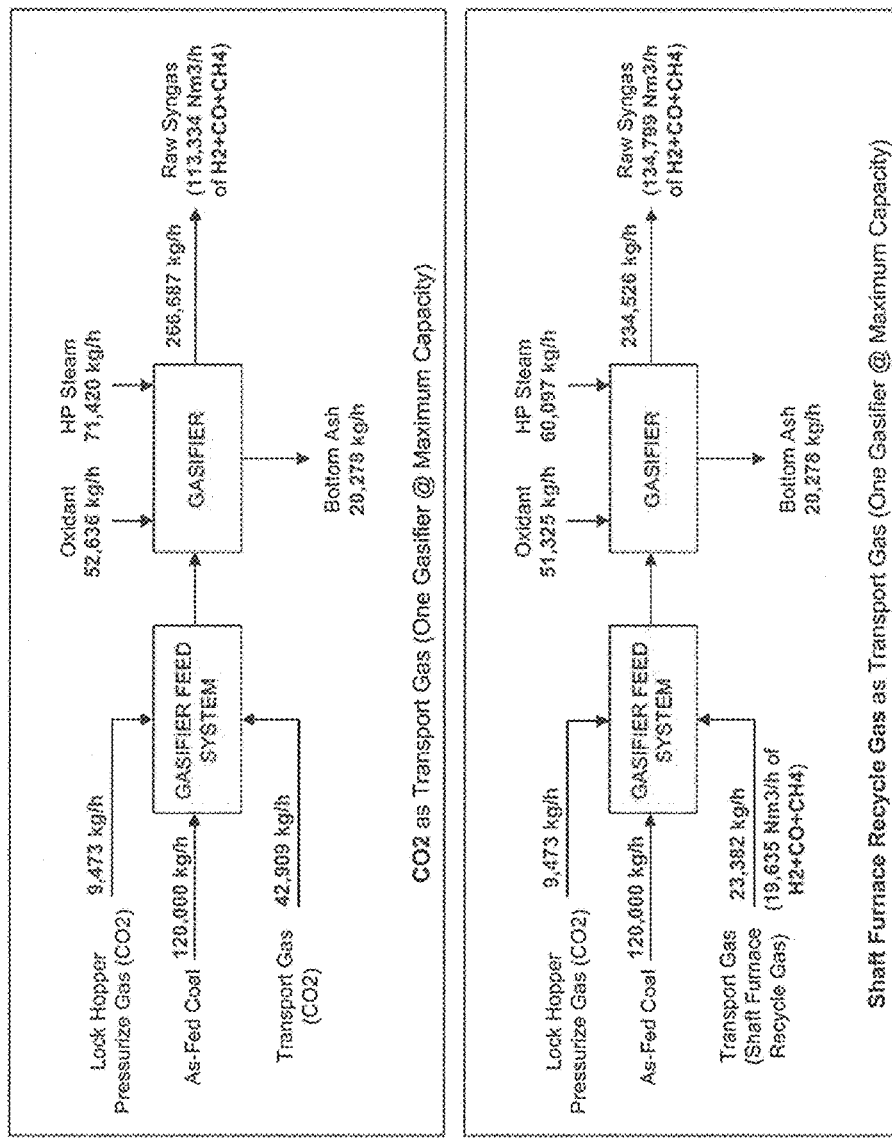
FIG. 3 shows an exemplary overall arrangement of two examples of gasifier systems where two different types of transport gas are used.

Example 3. Use of Top Gas as Transport Gas Increased Overall System Energy Efficiency, and Net Syngas Output Per Unit Coal, and Reduces $O_2$ and Stem Consumption FIG. 3 shows the overall arrangement of two exemplary gasifier systems, with the same coal consumption. In one, only $CO_2$ was used as transport gas, while in the other, a portion of the shaft furnace gas was used as part of transport gas. In both cases, the syngas from the gasifier was cleaned through an AGR unit, and then mixed with the recycled top gas. As shown in Table 5, when a portion of the shaft furnace gas was used as part of the transport gas, a net volume increase in $H_2+CO+CH_4$ (1,830 Nm$^3$/h) was achieved while the consumption of oxidant and steam was respectively decreased by 1,311 kg/h and 11,323 kg/h.

TABLE 5

Comparisons of Gasifier Performance

| | Transport Gas | Oxidant | HP Steam | Output Gas | Raw Syngas ($H_2$ + CO + $CH_4$) |
|---|---|---|---|---|---|
| CO2 as Transport Gas | CO2 42.909 kg/h | 52,636 kg/h | 71,420 kg/h | 266,687 kg/h | 113,334 Nm$^3$/h |
| SF RG as Part of Transport gas | CO2 23,382 kg/h SF RG* 19.635 Nm$^3$/h | 51,325 kg/h | 60,097 kg/h | 234,526 kg/h | 134,799 Nm$^3$/h |
| Δ | | −1,311 kg/h | −11,323 kg/h | −32,161 kg/h | 21,465 Nm$^3$/h** |

*SF RG (Shaft Furnace Recycle Gas) mainly includes CO + $H_2$ + $CH_4$.
**Increased raw syngas output (21,465 Nm$^3$/h) minus CO + $H_2$ + $CH_4$ contained in the recycled top gas (19.635 Nm$^3$/h) = net syngas output increase (1,830 Nm$^3$/h).

In another example of the comparison between top gas recycled from the MIDREX shaft furnace and recycled $CO_2$ used as transport gas, the material balances were evaluated on the basis of net clean syngas to the MIDREX DRI plant. As a result, a higher net clean syngas rate (229,924 Nm$^3$/h) was achieved when shaft furnace recycled top gas was used as gasifier transport gas, compared with a net syngas rate of 226,208 Nm$^3$/h when $CO_2$ was used. That is about 1.64% more net syngas per unit of coal.

It should be noted the method, apparatus and system of the present invention can be applied to various other dry-feed entrained gasifier, such as the SHELL, MITSUBISHI and NIPPON STEEL gasifiers, even though in systems where the gasification temperature and pressure is too high to leave enough $CH_4$ in syngas, the improvement in efficiency may be limited. Also, the method, apparatus and system of the present invention can be applied to two stage gasifiers such as Mitsubishi and Nippon Steel gasifier.

In some embodiment, carbon dioxide can optionally be removed from the syngas makeup for reduction gas using a carbon dioxide removal unit, and then the carbon dioxide-removed syngas can be used as reduction gas or a motive gas for a ejector as discussed above.

It is understood that examples and embodiments described herein are for illustrative purpose only and that various modifications or changes in light thereof will be suggested to persons skilled in the art and are to be included within the spirit and purview of this application and scope of the appended claims. As discussed above, methane-rich gas can be recycled at different steps of the invented flow. Different embodiments may comprise different process units or reactors, and those skilled in the art upon review of the disclosure.

All publications, patents and patent applications cited in this patent are hereby incorporated by reference for all purposes.

One or more features from any embodiment maybe combined with one or more features of any other embodiment without departing from the scope of the disclosure. The above description is illustrative and is not restrictive. Many variations of the invention will become apparent to those skilled in the art upon review of the disclosure. The scope of the invention should, therefore, be determined not with reference to the above description, but instead should be determined with reference to the claims along with their full scope or equivalents.

What is claimed is:

1. An apparatus for producing iron using a direct reduction iron production process, wherein iron ore fed into a shaft furnace is directly reduced with a reduction gas in a shaft furnace and a top gas emanates from the shaft furnace, the apparatus comprising:
    a first syngas delivery unit configured between a reactor of a fluidized bed coal gasification system and the shaft furnace for delivering syngas as at least a portion of the reduction gas, wherein the syngas is produced in the reactor in which carbonaceous materials react in a fluidized bed reactor under partially oxidized conditions with air and steam to produce syngas which comprises CO, $H_2$, $CO_2$ and $CH_4$, and wherein a transport gas is used in the movement of the carbonaceous materials into the reactor, or movement and recycling of ash particles;
    a second syngas delivery unit configured between the reactor and a gas heater connected to the shaft furnace for delivering syngas as at least a portion of fuel gas to the gas heater to heat the reduction gas to a temperature sufficient for use in the direct reduction process;
    a first top gas delivery unit configured to recycle at least a portion of the top gas as a reduction gas to the shaft furnace; and
    a second top gas delivery unit configured between the shaft furnace and the reactor for using at least a portion of the top gas as transport gas in the reactor.

2. The apparatus according to claim 1, further comprising:
    a flow controller configured to control the flow of the top gas used as transport gas to control the amount of the top gas as recycled reduction gas.

3. The apparatus according to claim 2, further comprising:
    an ejector configured to pressurize the top gas as recycled reduction gas before sending it into the shaft furnace, wherein the syngas used as reduction gas is a motive gas for the ejector.

4. The apparatus according to claim 3, further comprising:
    a carbon dioxide removal unit configured to remove carbon dioxide from the syngas used as reduction gas prior to using it as motive gas.

5. The apparatus according to claim 2, further comprising:
    a carbon dioxide removal unit configured to remove carbon dioxide from the top gas as recycled reduction gas prior to being pressurized.

6. The apparatus according to claim 1, further comprising:
    a compressor configured to compress the portion of the top gas to be used as the transport gas.

7. The apparatus according to claim 1, further comprising:
    a third top gas delivery unit configured to recycle at least a portion of the top gas as a fuel gas; and
    a flow controller configured to control the flow of the top gas used as fuel gas to control the amount of the top gas as recycled reduction gas.

8. A system for producing iron using a direct reduction iron production process, comprising:
    a shaft furnace in which iron ore is directly reduced with a reduction gas, wherein a top gas emanates from the top thereof;
    a fluidized bed coal gasification system in which carbonaceous materials react in a fluidized bed reactor under partially oxidized conditions with air and steam to produce syngas which comprises CO, $H_2$, $CO_2$ and $CH_4$, and wherein a transport gas is used in the movement of the carbonaceous materials into the reactor, and in the movement and recycling of ash particles;
    a first syngas delivery unit for using the syngas as at least a portion of the reduction gas;
    a second syngas delivery unit for using the syngas as at least a portion of fuel gas to heat the reduction gas to a temperature sufficient for use in the direct reduction process;
    a first top gas delivery unit configured to recycle at least a portion of the top gas as a reduction gas to the shaft furnace; and
    a second top gas delivery unit for using at least a portion of the top gas as transport gas in the fluidized bed reactor.

9. The system according to claim 8, further comprising:
    an ejector configured to pressurize the top gas as recycled reduction gas before sending it into the shaft furnace, wherein the syngas used as reduction gas is a motive gas for the ejector.

10. The system according to claim 9, further comprising:
    a carbon dioxide removal unit configured to remove carbon dioxide from the syngas used as reduction gas prior to using it as motive gas.

11. The system according to claim 8, further comprising:
    a carbon dioxide removal unit configured to remove carbon dioxide from the top gas as recycled reduction gas prior to being pressurized.

12. The system according to claim 8, further comprising:
    a third top gas delivery unit configured to recycle at least a portion of the top gas as a fuel gas; and
    a flow controller configured to control the flow of the top gas used as fuel gas to minimize the amount of the top gas as recycled reduction gas.

* * * * *